Patented Mar. 11, 1930

1,749,923

UNITED STATES PATENT OFFICE

JOSEPH VINCENT REARDON, OF ST. LOUIS, MISSOURI, ASSIGNOR TO THE REARDON COMPANY, OF ST. LOUIS, MISSOURI, A CORPORATION OF MISSOURI

COATING COMPOSITION

No Drawing.   Application filed November 9, 1926.   Serial No. 147,382.

My invention relates to paint compositions and the like and it is particularly useful as a cold water paint or as a waterproofing coating for structural cement and stucco surfaces, etc.

It is not recommended for woodwork. The desirable qualities of such a paint or coating are; cheapness of components and ease of compounding; prolonged storage of the dry mixture without deterioration; easy mixture with a cheap vehicle or diluent like water; ease and smoothness of application; reasonably quick drying; substantially permanent attachment to a wide variety of cement stucco and similar surfaces; and sufficient hardness to resist mechanical wear and weather; effective waterproofness. It is especially important that the latter qualities should be as permanent or enduring as possible.

The main object of the invention is to provide an improved composition for such purposes which is cheap and may not only be easily mixed up with water and efficiently applied as by spraying or brushing, but which also when applied and allowed to thicken and harden is water-proof or water-resistant and has excellent mechanical wearing and weathering qualities. Further objects, features and advantages will more clearly appear from the detail description given below wherein the preferred embodiment of my improvements is described in detail.

In the composition I have discovered I depend largely upon the cooperative effect of the ingredients lime and cement, to secure those advantages which have generally been secured, by the use of some more or less unstable material such as casein, glue, oils, etc. Results obtained from my paint indicate that its unusual permanence is due to the final product consisting of a substantially homogeneous composite material almost, if not wholly, mineral in character. This objective has been attained through the use of novel proportions and of hitherto unknown cooperative effects.

The novel and important base of my paint consists of large proportions of both lime and cement, which I prefer to use in about equal quantities. These materials are not employed simply as a pigment and a binder respectively. I have found that in the proportions claimed they cooperate to provide a paint which, when mixed with water, possesses many of the qualities of a good paint for certain purposes. These qualities are not approached by any paint produced from a base mixture in which little lime or cement is used. With such small amounts the mixed batch prematurely thickens so rapidly as to necessitate throwing away any mixed material which happens to be left unused for three or four hours after mixing, or on the other hand the mixture behaves like a lime wash and does not thicken soon enough after application to prevent its running.

I prefer to mix with the novel base, small amounts of salt, soap (such as calcium or aluminum stearate) and sugar. Each of these has been used in combination either with lime or with cement but in no case, so far as I am aware, has a small proportion of any one of them found practical application as a paint with a mixture of large proportions of both lime and cement, nor has sugar ever been used in a paint with cement, nor have any two of them been used in a paint with any cement mixture, nor have soap and sugar ever been used together in a paint.

I have discovered entirely new and unsuspected cooperative effects between these added materials and between these and my lime-cement base, which do not occur in a similar manner or degree with a base containing too small a proportion of either lime or cement.

In carrying out my invention, I prefer to first make up a dry base by thoroughly mixing in powdered form the following ingredients. Hydraulic cement (preferably white Portland cement) 50 parts; hydrated lime 50 parts; sodium chloride (ordinary salt) 7 parts; calcium stearate 3 parts; ordinary cane sugar 2 parts. The above parts are by weight. Increased waterproofness may be obtained if necessary by grinding the materials together for a few hours, as in a ball mill. Different colored pigments may be added, if desired, to give the paint any desired color.

The above are all mixed in dry form and to prepare the paint for use, I preferably take five pounds of this mixed base and stir the same thoroughly up to one gallon, with water.

As another example of a paint well adapted to general purposes I use ingredients in parts by weight as follows:

50 hydrated lime, 50 Portland cement, 7 common salt, 3 aluminum stearate.

These materials may be thoroughly mixed dry and, if protected from moisture, may be kept indefinitely. For use to the dry compound sufficient water is added to produce a desired consistency as a paint. About 5 lbs. of dry material is stirred up with water to make about 1 gallon of paint.

This paint remains fluid enough for brush or spray application for several hours and when applied stiffens quickly enough under ordinary weather conditions to avoid running or streaking; it does not harden so rapidly as to prevent it becoming firmly rooted to the surface to which it is applied and yet ultimately attains a satisfactory degree of hardness; it becomes so rooted to the surface that it does not depend for adhesion on any collodial sticky component; it has a degree of substantially permanent water-proofness hitherto only secured temporarily by the use of oils or other materials which disintegrate with age or exposure; it spreads well under the brush; it presents an attractive surface and its cost is low.

The lime I believe acts to retard the rate of stiffening of the cement in the paint to some extent which is desirable, but it also in the proportions used, materially increases the spread or covering power (hiding power) of the paint. The sodium chloride I believe acts as a hygroscopic salt to take up moisture from the air and especially to help retain moisture in the paint. Salt may either retard the rate of setting somewhat, if desirable, or in smaller proportions hasten it. It tends to prevent cracking and a too thorough drying out after the paint has first set and it materially increases the ultimate hardness attained by the paint film. The stearate acts cooperatively as a water-proofing or water-resisting agent, closing the pores of the paint and acting to shed water. The sugar if used acts to better the flow, that is, it seems to make the paint spread out more evenly and enables the same to be applied more easily and efficiently. It also has a remarkable cooperative effect when used with salt and the stearates.

It will be noted that my coating composition is oil free, that is, it does not depend on linseed oil or other oil as a vehicle, so that the paint or composition is not subject to the disadvantages attendant upon the use of oils as vehicles.

My finished composition when applied and allowed to harden forms a highly desirable water-proof and weather-proof coating which adheres to concrete, stucco, brick and tile so firmly as generally to become practically part thereof.

Instead of using the hydrated lime, materials known as whiting, calcium carbonate, chalk and also aluminum silicates such as clays may be used in part, and for some purposes such as indoor work particularly when colors are used the lime may be substantially omitted, although the paint is not as satisfactory for general use. Instead of Portland cement other hydraulic cements may be used, as the cement material, such as that from which Portland cement took its name or pozzualana or trasse and the like when combined with certain materials such as were used to form the old Roman Portland cements, as well as the modern cements from rock, clay, or blast furnace slag compounded with lime, but a good grade of the latter such as Atlas Portland Cement Co. white cement is preferred. Instead of the common salt, other hygroscopic salts may be used but common salt I believe has distinct advantages over other hygroscopic salts. Instead of calcium stearate, other stearates such as aluminum stearate, zinc stearate, and other water-repellent metallic soaps may be used. Also instead of using such stearates or soaps, a stearate or soap forming body may be used, that is, one which forms a stearate or other water-repellent metallic soap with one or more of the other ingredients when the paint is mixed and applied. Thus for example tallow may be included, which may form a stearate with the lime in the paint.

I prefer to use a good high grade waterproofing stearate of suitable physical and chemical characteristics and the amount of such water repellent stearate used will of course depend on the quality or such stearate available. Instead of cane sugar, other sugars such as various glucoses may be used and in some cases the sugar may be left out altogether.

The constitution of my coating composition may be intelligently modified to best adapt it to any particular requirements such as unusual waterproofness to withstand considerable water pressures or to reach a superior degree of hardness or to harden quickly, etc. The actual proportions will, of course, vary with these specially desired effects and with the particular materials used. Thus in the novel field in which I work the ingredients and their proportions may vary widely while fully employing the principles I have discovered and without departing from the spirit of my invention.

The expressions "about equal proportions" or "not over about 50 parts hydraulic cement and not over about 50 parts lime" as referring to lime and cement mixtures, are intended to include not only those mixtures in which the lime and cement are in approximately equal proportions, but also those in which the lime and cement vary from such approximately equal proportions without changing their co-operative effect.

Thus while I have described my invention in the preferred forms thereof, nevertheless many changes and modifications may be made, without departing from the spirit and scope of the invention in its broader aspects. Hence I desire to cover all forms or modifications coming within the language or scope of any one or more of the appended claims.

What I claim as new and desire to secure by Letters Patent, is:

1. A water paint characterized by the facts that it attaches itself firmly to structural substances of mineral character, becomes practically wear- and weather-proof, contains a mineral base having a binder in which each of the ingredients, lime and cement, is present in major proportions, and consists of about half its weight of water adapting it to painting by brush or spray.

2. A water paint characterized by the facts that it attaches itself firmly to structural substances of mineral character, becomes practically wear- and weather-proof and substantially free from cracks, contains a mineral base comprising a lime-cement binder with a small proportion of salt, and consists of about half its weight of water adapting it to painting by brush or spray.

3. A water paint characterized by the facts that it attaches itself firmly to structural substances of mineral character, becomes practically wear- and weather-proof, hard, and practically water-proof and damp-resistant, contains a mineral base comprising a lime-cement binder with small proportions of salt and soap, and consists of about half its weight of water adapting it to painting by brush or spray.

4. A water paint characterized by the facts that it attaches itself firmly to structural substances of mineral character, becomes practically wear- and weather-proof, hard and practically water-proof and damp-resistant, contains a mineral base comprising a lime-cement binder, with small proportions of salt and sugar and consists of about half its weight of water adapting it to painting by brush or spray.

5. A water paint characterized by the facts that it attaches itself firmly to structural substances of mineral character, becomes practically wear- and weather-proof, hard, practically water-proof and damp resistant, contains a mineral base comprising a lime-cement binder with small proportions of salt, soap and sugar and consists of about half its weight of water adapting it to painting by brush or spray.

6. A water paint like that set forth in claim 1 characterized by the fact that the lime-cement binder consists of about equal proportion of lime and cement.

7. A water paint like that set forth in claim 3 characterized by the fact that the lime-cement binder consists of about equal proportion of lime and cement.

8. A water paint like that set forth in claim 5 characterized by the fact that the lime-cement binder consists of about equal proportion of lime and cement.

9. A structural substance of mineral character having a paint coating strongly attached to and practically integral therewith resulting from the setting of a cold water hydraulic cement paint containing a hygroscopic salt and a water-repellent soap, the coating of which exhibits a high degree of durability water- and weather-proofness.

10. A structural substance of mineral character having a paint coating resulting from the setting of a paint mixture containing hydraulic cement, hydrated lime, a water-repellent soap and water, the coating of which exhibits a high degree of durability, water- and weather-proofness.

11. A structural substance of mineral character having a paint coating resulting from the setting of a paint mixture containing hydraulic cement, hydrated lime, a water-repellent soap, a hygroscopic salt and water, the coating of which exhibits a high degree of durability, water- and weather-proofness.

12. A paint base comprising a lime-cement binder which includes not over about 50 parts hydraulic cement and not over about 50 parts lime accompanied by a small amount of salt and a small amount of soap.

13. A paint base comprising a lime-cement binder which includes not over about 50 parts hydraulic cement and not over about 50 parts lime accompanied by a small amount of salt and a small amount of sugar.

14. A paint base comprising a lime-cement binder which includes not over about 50 parts hydraulic cement and not over about 50 parts lime accompanied by a small amount of salt, a small amount of soap and a small amount of sugar.

15. A cold water paint containing about 50 parts by weight of Portland cement, about 50 parts by weight of hydrated lime, about 7 parts by weight of hygroscopic salt, about 3 parts by weight of a water repellent metallic soap and about 2 parts by weight of sugar.

16. A water paint characterized by the facts that it attaches itself firmly to structural surfaces of mineral character, contains a mineral base comprising a binder in which each of the ingredients lime and cement is present in major proportions, and salt, and contains sufficient water to give it a consistency adapting it to painting by brush or spray.

17. A water paint characterized by the facts that it attaches itself firmly to structural surfaces of mineral character, contains a mineral base comprising a binder in which each of the ingredients lime and cement is present in major proportions, and salt in less parts by weight than either the cement or lime, and contains sufficient water to give it a consistency adapting it to painting by brush or spray.

18. A water paint characterized by the facts that it attaches itself firmly to structural surfaces of mineral character, the combined ingredients lime and cement constituting the major proportion of the binder, and salt in less parts by weight than either the cement or lime, and contains about half its weight of water to give it a consistency adapting it to painting by brush or spray.

19. A paint base comprising salt and a binder consisting of lime and cement, the salt being in less parts by weight than either the cement being in less parts by weight than either the cement or lime, which base when mixed with about equal proportion of water by weight adapting it to be brushed or sprayed, thickens and hardens into a practically water wear- and weather-proof coating.

In testimony whereof I have signed my name to this specification.

JOSEPH VINCENT REARDON.

CERTIFICATE OF CORRECTION.

Patent No. 1,749,923. / Granted March 11, 1930, to

JOSEPH VINCENT REARDON.

It is hereby certified that error appears in the printed specification of the above numbered patent requiring correction as follows: Page 4, lines 22 and 23, claim 19, strike out the words "being in less parts by weight than either the cement"; and that the said Letters Patent should be read with this correction therein that the same may conform to the record of the case in the Patent Office.

Signed and sealed this 8th day of April, A. D. 1930.

M. J. Moore,
Acting Commissioner of Patents.

(Seal)